United States Patent [19]
Kojima

[11] Patent Number: 5,086,228
[45] Date of Patent: Feb. 4, 1992

[54] METHOD FOR ELIMINATING NONUNIFORMITY IN SENSITIVITY IN IMAGE READ-OUT APPARATUSES

[75] Inventor: Tetsuya Kojima, Kanagawa, Japan

[73] Assignee: Fuji Photo Film Co., Ltd., Kanagawa, Japan

[21] Appl. No.: 612,385

[22] Filed: Nov. 14, 1990

[30] Foreign Application Priority Data

Nov. 14, 1989 [JP] Japan .................................. 1-295626

[51] Int. Cl.$^5$ ............................................. G01N 23/04
[52] U.S. Cl. ................................. 250/327.2; 250/484.1
[58] Field of Search ................. 250/327.2 C, 327.2 G, 250/327.2 F, 484.1; 358/163

[56] References Cited

U.S. PATENT DOCUMENTS

| | | | |
|---|---|---|---|
| 4,258,264 | 3/1981 | Kotera et al. | |
| 4,276,473 | 6/1981 | Kato et al. | |
| 4,315,318 | 2/1982 | Kato et al. | |
| 4,387,428 | 6/1983 | Ishida et al. | |
| 4,520,595 | 5/1985 | Abe | 358/163 |
| 4,695,884 | 9/1987 | Anastassiou et al. | 358/163 |
| 4,734,783 | 3/1988 | Horikawa | 358/163 |
| 4,864,134 | 9/1989 | Hosoi et al. | |
| 4,885,467 | 12/1989 | Horikawa | 358/163 |
| 4,985,629 | 1/1991 | Horikawa | 250/327.2 |

FOREIGN PATENT DOCUMENTS 56-11395 2/1981 Japan .
61-5193 2/1986 Japan .

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

Nonuniformity in sensitivity is eliminated in an image read-out apparatus wherein a light beam is reflected and deflected by a rotating polygon mirror such that it scans a recording medium, on which an image has been recorded, in a main scanning direction, the recording medium is simultaneously moved with respect to the light beam in a sub-scanning direction approximately normal to the main scanning direction, and light radiated out of the recording medium during the scanning is detected and converted into an image signal. Information about the characteristics of the shading along the main scanning direction is stored in a storage device. In the course of obtaining the image signal, correction values each of which is used to correct the characteristics of the shading with respect to each reflecting surface of the rotating polygon mirror, are found from the image signal. The image signal is then corrected in accordance with the characteristics of the shading and the correction values.

11 Claims, 5 Drawing Sheets

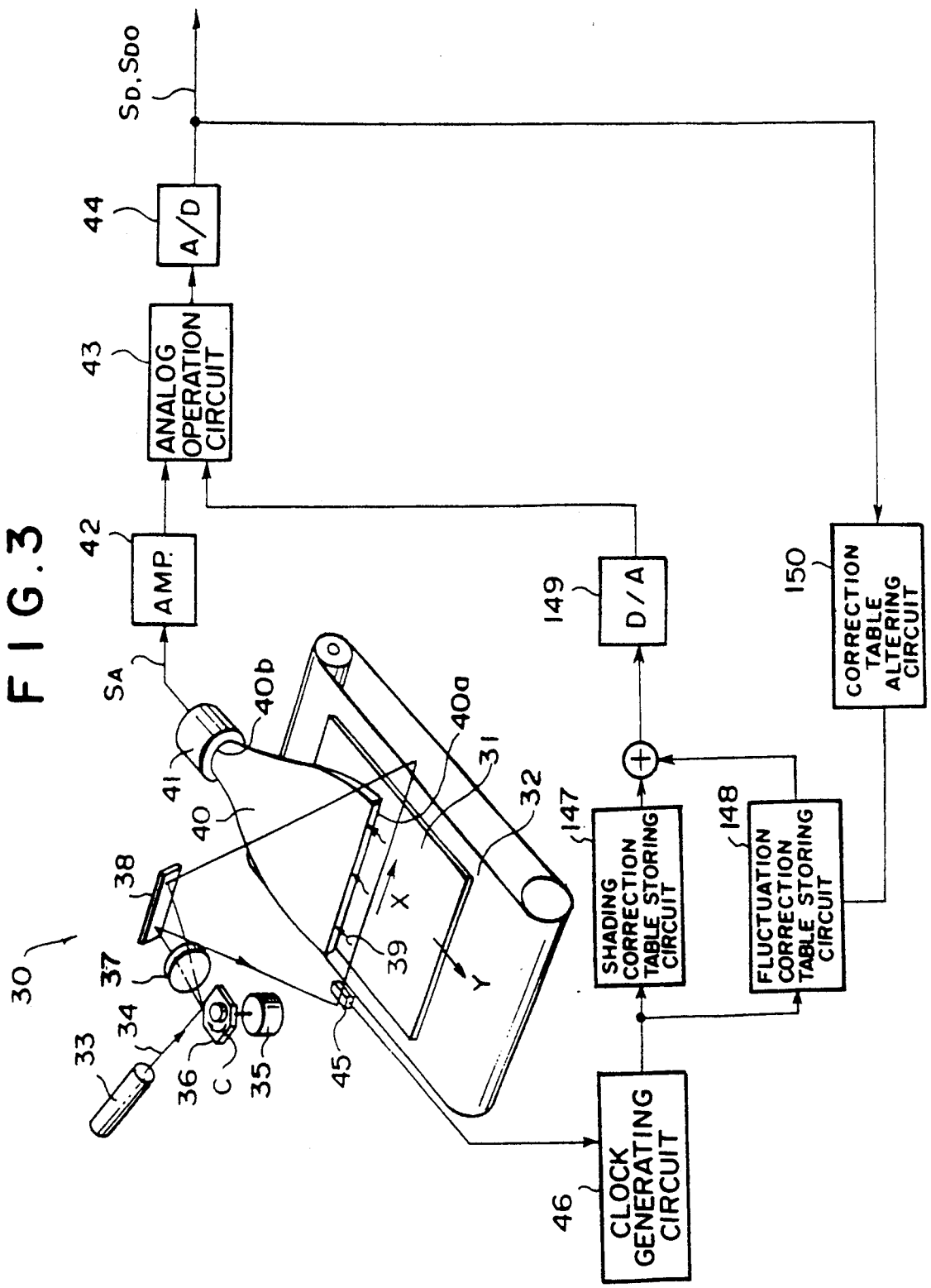

METHOD FOR ELIMINATING NONUNIFORMITY IN SENSITIVITY IN IMAGE READ-OUT APPARATUSES

BACKGROUND OF THE INVENTION

1. Field of the Invention

This invention relates to a method for eliminating nonuniformity in sensitivity in an image read-out apparatus wherein a light beam is reflected and deflected by a rotating polygon mirror such that it scans a recording medium, on which an image has been recorded, in a main scanning direction, the recording medium is simultaneously moved with respect to the light beam in a sub-scanning direction approximately normal to the main scanning direction, the recording medium being thereby scanned with the light beam in two directions, and light is detected which is radiated out of the recording medium during the scanning and which represents the image.

2. Description of the Prior Art

Techniques for reading out an image, which has been recorded on a recording medium, in order to obtain an image signal, carrying out appropriate image processing on the image signal, and then reproducing a visible image by use of the processed image signal have heretofore been known in various fields.

For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph or the like. In this manner, a visible image having good image quality with high contrast, high sharpness, high graininess, or the like can be reproduced Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the image recording and reproducing systems described above, an image read-out apparatus is used in order to detect an image signal from a recording medium on which an image has been recorded (e.g. X-ray film on which an X-ray image has been recorded, or a stimulable phosphor sheet on which a radiation image has been stored with radiation, such as X-rays or cathode rays) In general, in the image read-out apparatus, a light beam is reflected and deflected by a rotating polygon mirror, which has a plurality of reflecting surfaces, such that the light beam scans a recording medium, on which an image has been recorded, in a main scanning direction. At the same time, the recording medium is scanned with the light beam in a sub-scanning direction which is approximately normal to the main scanning direction. When each portion of the recording medium is thus scanned, light representing the image is radiated out of the scanned portion of the recording medium. (For example, in cases where the recording medium is X-ray film, light which has passed through the X-ray film is obtained. In cases where the recording medium is a stimulable phosphor sheet, which is scanned with stimulating rays, it emits light in proportion to the amount of energy stored thereon during its exposure to the radiation.) The light thus radiated out of the recording medium is detected and converted into an image signal by a photoelectric conversion means, which has a light receiving surface, positioned to extend along the main scanning line on the recording medium. (By way of example, the photoelectric conversion means is constituted of a combination of a light guide member with a photomultiplier. The light guide member has a light receiving surface, positioned to extend along the main scanning line on the recording medium, and a ring-shaped light output face. The photomultiplier receives the light emanating from the light output face of the light guide member. Alternatively, as disclosed in, for example, U.S. Pat. No. 4,864,134, the photoelectric conversion means may be constituted of a long photomultiplier, which has a long light receiving surface, positioned to extend along the main scanning line, and which is located close to the recording medium.)

It is necessary that the image signal obtained from the image read-out apparatus accurately represents the image, which was recorded on the recording medium.

However, the problem described below often occurs. Specifically, when a recording medium, such as X-ray film or a stimulable phosphor sheet, is uniformly exposed to X-rays or radiation, a uniform image thus being recorded on the recording medium, the recording medium is then scanned with a light beam, and the light, which is radiated out of the recording medium during the scanning and which represents the image, is photoelectrically detected and converted into an image signal by the photoelectric conversion means, the image signal should have uniform value. However, it often occurs that the value of the image signal thus detected is not uniform. The reasons why such a problem occurs will be described hereinbelow.

By way of example, the photoelectric conversion means exhibit certain characteristics of shading. Specifically, even if the amount of light impinging upon the light receiving surface of the photoelectric conversion means is the same, the sensitivity with which the photoelectric conversion means detects the light varies in accordance with the position with respect to the main scanning direction with which the light impinges upon the light receiving surface. During the operation of the image read-out apparatus, little change occurs in the characteristics of the shading unless the photoelectric conversion means is exchanged with a new one.

Also, problems with regard to surface inclination are caused to occur primarily by the deviation in position of the rotation axis from the center axis of the rotating polygon mirror. Specifically, even if the light beam impinges upon the rotating polygon mirror from the same direction, the directions along which the light beam is reflected by different reflecting surfaces of the rotating polygon mirror deviate in the sub-scanning direction. In such a case, the intervals at which a plurality of scanning lines of the light beam are formed on the recording medium, does not become uniform with respect to the sub-scanning direction. As a result, when a visible image is reproduced from the image signal detected from the recording medium, nonuniformity in the image density occurs in the sub-scanning direction for a period corresponding to one turn of the rotating polygon mirror. The extent to which the adverse effects occur from the surface inclination often changes during the operation of the image read-out apparatus.

Nonuniformity in the image density due to the rotating polygon mirror is also caused to occur due to a slight difference in reflectivity or curvature among the reflecting surfaces of the rotating polygon mirror and due to the difference in reflectivity of the various parts of each reflecting surface. Such nonuniformity often changes during the operation of the image read-out apparatus.

In order for the shading, the nonuniformity in the image density, or the like, to be eliminated, a novel method has been proposed in,. for example, U.S. patent application Ser. No. 391,830, now U.S. Pat. No. 4,985,629. With the proposed method, a recording medium is uniformly exposed to X-rays, radiation, or the like. The recording medium, which has been uniformly exposed to the X-rays, the radiation, or the like, is then scanned with a light beam, and the light radiated out of the recording medium during the scanning is photoelectrically detected. In this manner, by way of example, the nonuniformity in sensitivity along the main scanning direction is detected with respect to the respective reflecting surfaces of the rotating polygon mirror. (The nonuniformity in the sensitivity includes not only the nonuniformity in the sensitivity, with which the photoelectric conversion means detects the light radiated out of the recording medium, along the main scanning direction, but also the effects from the nonuniformity in the image density, differences in reflectivity among the reflecting surfaces of the rotating polygon mirror, or the like. All of sources, from which the problems occur in an image signal having uniform value cannot be obtained from a recording medium when the recording medium was exposed uniformly to X-rays, radiation, or the like, will hereinbelow be referred to as nonuniformity in the sensitivity.) The information about the nonuniformity in the sensitivity is stored in a storage means. When an image signal representing an image is detected from a recording medium, on which the image has been recorded, the image signal is corrected in accordance with the information of the nonuniformity in the sensitivity, which is stored in the storage means.

However, often the extent of the surface inclination of the rotating polygon mirror changes during the operation of the image read-out apparatus. As a result, the nonuniformity in the sensitivity changes. Therefore, in order that image signals accurately representing the images be obtained, it is necessary for operations to be carried out, for example, periodically, wherein a recording medium is uniformly exposed to radiation, or the like, and an image signal is detected from the recording medium, which has been uniformly exposed to the radiation, or the like, with the image read-out apparatus. However, considerable time and labor are required to carry out such operations. Also, it is not easy to irradiate radiation, or the like, uniformly to the recording medium. It is possible for the manufacturer of the image read-out apparatus to detect the nonuniformity in the sensitivity by uniformly exposing the recording medium to radiation, or the like, in the course of assembling the image read-out apparatus. However, from the point of view of the required time and labor and the accuracy with which the nonuniformity in the sensitivity is detected, it is difficult to have the user of the image read-out apparatus periodically detect the nonuniformity in the sensitivity.

SUMMARY OF THE INVENTION

The primary object of the present invention is to provide a method for eliminating nonuniformity in sensitivity in an image read-out apparatus wherein the nonuniformity in the sensitivity or the characteristics of shading are found in the course of assembling the image read-out apparatus and thereafter any change in the nonuniformity in the sensitivity is compensated automatically.

Another object of the present invention is to provide a method for easily and accurately eliminating nonuniformity in sensitivity in an image read-out apparatus.

The present invention provides a first method for eliminating nonuniformity in sensitivity in an image read-out apparatus which is provided with:
i) a light beam producing means which produces a light beam,
ii) a main scanning means provided with a rotating polygon mirror, which has a plurality of reflecting surfaces and which reflects and deflects the light beam such that it scans a recording medium, on which an image has been recorded, in a main scanning direction,
iii) a sub-scanning means, which moves the recording medium with respect to the light beam in a sub-scanning direction approximately normal to the main scanning direction, and iv) a photoelectric conversion means for detecting light, which is radiated out of the recording medium during the scanning with the light beam and which represents the image, and generating an image signal representing the image, the method for eliminating nonuniformity in sensitivity in an image read-out apparatus comprising the steps of:

a) storing the information about the characteristics of the shading along the main scanning direction in a storage means, b) in the course of obtaining said image signal, finding correction values, each of which is used to correct said characteristics of the shading with respect to each of said reflecting surfaces of said rotating polygon mirror, from said image signal, and c) correcting said image signal in accordance with said characteristics of the shading and said correction values.

The present invention also provides a second method for eliminating nonuniformity in sensitivity in an image read-out apparatus which is provided with:

i) a light beam producing means which produces a light beam, ii) a main scanning means provided with a rotating polygon mirror, which has a plurality of reflecting surfaces and which reflects and deflects the light beam such that it scans a recording medium, on which an image has been recorded, in a main scanning direction, iii) a sub-scanning means, which moves the recording medium with respect to the light beam in a sub-scanning direction approximately normal to the main scanning direction, and iv) a photoelectric conversion means for detecting light, which is radiated out of the recording medium during the scanning with the light beam and which represents the image, and generating an image signal representing the image, the method for eliminating nonuniformity in sensitivity in an image read-out apparatus comprising the steps of:

a) storing the information about the characteristics of the shading along the main scanning direction and the information about first correction values, each of which is used to correct said characteristics of the shading with respect to each of said reflecting surfaces of said rotating polygon mirror, in a storage means, b) in the course of obtaining said image signal, correcting said image signal in accordance with said characteristics of the shading and said first correction values, c) finding second correction values, which are used to correct said first correction values, from said image signal, and d) correcting the information about said first correction values, which is stored in said storage means, in accordance with said second correction values.

In the course of correcting the information about the first correction values, the first correction values may be completely replaced by the second correction values. In order for the problem to be prevented from occurring in that the first correction values are altered to extreme values when an image having a special density pattern is read out, the first correction values should preferably be changed only slightly in accordance with the second correction values each time an image is read out.

The first and second methods for eliminating nonuniformity in sensitivity in an image read-out apparatus in accordance with the present invention are based on the findings that the characteristics of shading of a photoelectric conversion means cause the nonuniformity in the sensitivity to occur along the main scanning direction, and that a change in the nonuniformity in the sensitivity is caused to occur in the sub-scanning direction by, for example, a change in the extent of surface inclination of a rotating polygon mirror during the operation of the image read-out apparatus. Specifically, when an image recorded on a single recording medium is read out, the rotating polygon mirror carries out the main scanning very many times. Therefore, the image signal components of the image signal representing the picture elements in the image, which are scanned with the light beam reflected and deflected by each reflecting surface of the rotating polygon mirror, may be averaged for each reflecting surface. In this manner, as for the nonuniformity in the sensitivity along the sub-scanning direction, correction values can be found which are approximately identical with those found when a recording medium exposed uniformly to radiation, or the like, is used.

With the first method for eliminating nonuniformity in sensitivity in an image read-out apparatus in accordance with the present invention, the information about the characteristics of the shading along the main scanning direction is stored in the storage means. In the course of obtaining the image signal, the correction values, each of which is used to correct the characteristics of the shading with respect to each of the reflecting surfaces of the rotating polygon mirror, are found from the image signal. Thereafter, the image signal is corrected in accordance with the characteristics of the shading and the correction values. Therefore, any change in the nonuniformity in the sensitivity, which may occur during the operation of the image read-out apparatus, can be compensated automatically by carrying out an ordinary image read-out operation. Accordingly, the operator of the image read-out apparatus need not carry out any particular operation for detecting a change in the nonuniformity in the sensitivity.

With the second method for eliminating nonuniformity in sensitivity in an image read-out apparatus in accordance with the present invention, the information about the characteristics of the shading along the main scanning direction and the information about the first correction values, each of which is used to correct the characteristics of the shading with respect to each of the reflecting surfaces of the rotating polygon mirror, are stored in the storage means. In the course of obtaining the image signal, the image signal is corrected in accordance with the characteristics of the shading and the first correction values. Also, the second correction values, which are used to correct the first correction values, are found from the image signal. Thereafter, the information about the first correction values, which is stored in the storage means, is corrected in accordance with the second correction values. Therefore, any change in the nonuniformity in the sensitivity, which may occur during the operation of the image read-out apparatus, can be compensated automatically by carrying out an ordinary image read-out operation. Accordingly, the operator of the image read-out apparatus need not carry out any particular operation for detecting a change in the nonuniformity in the sensitivity.

Also, with the second method for eliminating nonuniformity in sensitivity in an image read-out apparatus in accordance with the present invention, the information about the characteristics of the shading along the main scanning direction is stored in the storage means together with the information about the first correction values, which are used to correct the characteristics of the shading with respect to the respective reflecting surfaces of the rotating polygon mirror. Therefore, by changing the first correction values only slightly in accordance with the second correction values each time an image is read out, the problem can be prevented from occurring in that the first correction values are altered to extreme values when, for example, an image having a special density pattern is read out.

The present invention further provides a third method for eliminating nonuniformity in sensitivity in an image read-out apparatus which is provided with:
  i) a light beam producing means which produces a light beam,
  ii) a main scanning means provided with a rotating polygon mirror, which has a plurality of reflecting surfaces and which reflects and deflects the light beam such that it scans a recording medium, on which an image has been recorded, in a main scanning direction,
  iii) a sub-scanning means, which moves the recording medium with respect to the light beam in a sub-scanning direction approximately normal to the main scanning direction, and
  iv) a photoelectric conversion means for detecting light, which is radiated out of the recording medium during the scanning with the light beam and which represents the image, and generating an image signal representing the image,
  the method for eliminating nonuniformity in sensitivity in an image read-out apparatus comprising the steps of:
  a) storing the information about the characteristics of the shading along the main scanning direction and the information about first correcting functions, each of which has been found for each of said reflecting surfaces of said rotating polygon mirror and is used to correct said characteristics of the shading with respect to the respective positions located along the main scanning direction, in a storage means,
  b) in the course of obtaining said image signal, correcting said image signal in accordance with said characteristics of the shading and said first correcting functions,
  c) finding second correcting functions, which are used to correct said first correcting functions, from said image signal, and
  d) correcting the information about said first correcting functions, which is stored in said storage means, in accordance with said second correcting functions.

In the course of correcting the information about the first correcting functions, the first correcting functions may be completely replaced by the second correcting functions. In order for the problem to be prevented from occurring in that the first correcting functions are altered to extreme functions when an image having a special density pattern is read out, the first correcting functions should preferably be changed only slightly in accordance with the second correcting functions each time an image is read out.

The third method for eliminating nonuniformity in sensitivity in an image read-out apparatus in accordance with the present invention is based on the findings described below. Specifically, when an image recorded on a single recording medium is read out in the image read-out apparatus, the rotating polygon mirror carries out the main scanning very many times. Therefore, the image signal components of the image signal representing the picture elements in the image, which are scanned with the light beam reflected and deflected by each reflecting surface of the rotating polygon mirror, may be averaged for each of the positions located along the main scanning direction. In this manner, correcting functions can be found which are approximately identical with those found when a recording medium exposed uniformly to radiation, or the like, is used.

With the third method for eliminating nonuniformity in sensitivity in an image read-out apparatus in accordance with the present invention, the information about the characteristics of the shading along the main scanning direction is stored in the storage means. Also, the information about the first correcting functions, each of which is used to correct the characteristics of the shading with respect to each reflecting surface of the rotating polygon mirror and with respect to each of positions located along the main scanning direction and corresponding to each said reflecting surface, is stored in the storage means. In the course of obtaining the image signal, the image signal is corrected in accordance with the characteristics of the shading and the first correcting functions. Also, the second correcting functions, which are used to correct the first correcting functions, are found from the image signal. Thereafter, the information about the first correcting functions, which is stored in the storage means, is corrected in accordance with the second correcting functions. Therefore, any change in the nonuniformity in the sensitivity, which may occur during the operation of the image read-out apparatus, can be compensated automatically by carrying out an ordinary image read-out operation. Accordingly, the operator of the image read-out apparatus need not carry out any particular operation for detecting a change in the nonuniformity in the sensitivity.

Also, with the third method for eliminating nonuniformity in sensitivity in an image read-out apparatus in accordance with the present invention, the information about the characteristics of the shading along the main scanning direction is stored in the storage means together with the information about the first correcting functions, each of which is used to correct the characteristics of the shading with respect to each reflecting surface of the rotating polygon mirror and with respect to each of positions located along the main scanning direction and corresponding to each said reflecting surface. Therefore, by changing the first correcting functions only slightly in accordance with the second correcting functions each time an image is read out, the problem can be prevented from occurring in that the first correcting functions are altered to extreme functions when, for example, an image having a special density pattern is read out.

As will be understood from the specification, it should be noted that the term "moving a recording medium with respect to a light beam in a sub-scanning direction" as used herein means movement of the recording medium relative to the light beam in the sub-scanning direction, and embraces both the cases wherein the recording medium is moved while the light beam is kept stationary with respect to the sub-scanning direction, and cases wherein the light beam is moved in the sub-scanning direction while the recording medium is kept stationary.

BRIEF DESCRIPTION OF THE DRAWINGS

FIG. 3 is a schematic view showing an image read-out apparatus wherein an embodiment of the third method for eliminating nonuniformity in sensitivity in accordance with the present invention is employed.

DESCRIPTION OF THE PREFERRED EMBODIMENTS

The present invention will hereinbelow be described in further detail with reference to the accompanying drawings.

Figure 1:
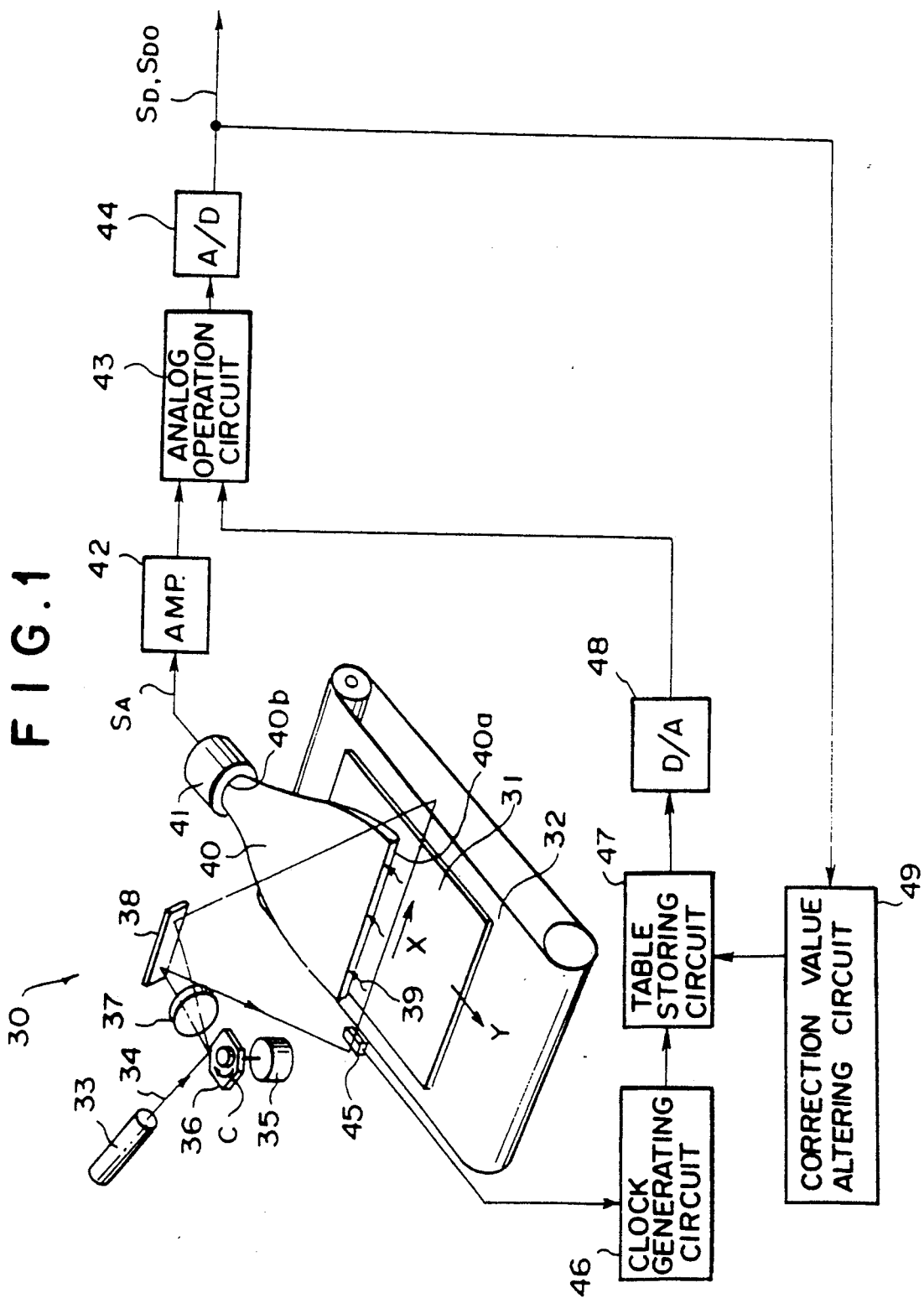
FIG. 1 is a schematic view showing an image read-out apparatus wherein an embodiment of the second method for eliminating nonuniformity in sensitivity in accordance with the present invention is employed.

FIG. 1 is a schematic view showing an image read-out apparatus wherein an embodiment of the second method for eliminating nonuniformity in sensitivity in accordance with the present invention is employed. The image read-out apparatus is constituted as an X-ray image read-out apparatus wherein an X-ray image is read out from a stimulable phosphor sheet, on which the X-ray image has been stored, and an image signal is thereby generated.

In an X-ray image recording apparatus (not shown), a stimulable phosphor sheet 31 is exposed to X-rays, which have passed through an object. An X-ray image of the object is thereby stored on the stimulable phosphor sheet 31. The stimulable phosphor sheet 31, on which the X-ray image has been stored, is then set at a predetermined position in an X-ray image read-out apparatus 30.

The stimulable phosphor sheet 31, which has been set at the predetermined position, is then conveyed in a sub-scanning direction indicated by the arrow Y by an endless belt 32, which is operated by an operating means (not shown). A laser beam 34, which serves as stimulating rays, is produced by a laser beam source 33, and is reflected and deflected by a rotating polygon mirror 36 which is quickly rotated by a motor 35 in the direction indicated by the arrow C. The laser beam 34 then passes through an fθ lens 37. The direction of the optical path of the laser beam 34 is then changed by a mirror 38, and the laser beam 34 impinges upon the stimulable phosphor sheet 31 and scans it in a main scanning direction indicated by the arrow X, which direction is approximately normal to the sub-scanning direction indicated by the arrow Y. When the stimulable phosphor sheet 31 is exposed to the laser beam 34, the exposed portion of the stimulable phosphor sheet 31 emits light 39 in an amount proportional to the amount of energy stored thereon during its exposure to the X-rays. The emitted light 39 is guided by a light guide member 40 and photoelectrically detected by a photomultiplier 41. The light guide member 40 is made from a light guiding material such as an acrylic plate and has a linear light input face 40a, positioned so that it extends along the main scanning line on the stimulable phosphor sheet 31, and a ring-shaped light output face 40b, positioned so that it is in close contact with a light receiving face of the photomultiplier 41. The emitted light 39, which has entered the light guide member 40 at its light input face 40a, is guided through repeated total reflection inside of the light guide member 40, emanates from the light output face 40b, and is received by the photomultiplier 41. In this manner, the amount of the emitted light 39, which represents the X-ray image, is converted into an electric signal by the photomultiplier 41.

An analog signal SA generated by the photomultiplier 41 is amplified by an amplifier 42 and then fed into an analog operation circuit 43, which will be described later. The analog signal, which has been generated by the analog operation circuit 43, is fed into an A/D converter 44. The A/D converter 44 samples the analog signal and converts it into a digital image signal SD. The image signal SD is fed into an image processing unit (not shown), which carries out appropriate image processing on the image signal SD. After being processed, the image signal SD is fed into an image reproducing apparatus (not shown), which reproduces a visible image from the image signal SD.

The manner in which a clock signal is generated will be described hereinbelow. The clock signal is used to specify the reflecting surface, which is reflecting and deflecting the laser beam 34 at any given instant, among a plurality of (in the example of FIG. 1, six) reflecting surfaces of the rotating polygon mirror 36.

A position sensitive device (PSD) 45 is located on the main scanning line of the laser beam 43 at a position outside of the stimulable phosphor sheet 31. First, without the stimulable phosphor sheet 31 placed at the position for exposure to the laser beam 34 the rotating polygon mirror 36 is rotated by the motor 35, and the laser beam 4 is caused to scan repeatedly in the main scanning direction. The position of the laser beam 34, which is reflected and deflected by the respective reflecting surfaces of the rotting polygon mirror 36, and fluctuates in the sub-scanning direction indicated by the arrow Y is found. Such a fluctuation is caused by, for example, the inclination of the shaft of the motor 35. (The extent to which such a fluctuation occurs will hereinbelow be referred to as the extent of surface inclination.) A signal, which is generated by the PSD 45 and which represents the extent of surface inclination, is fed into a clock signal generating circuit 46 and stored in a storage circuit thereof.

Further, the method of specifying the reflecting surface of the polygon mirror is not limited to the above-described method. For example, a method using a sensor which outputs a signal corresponding to the specific reflecting surface of the polygon mirror can be used.

Figure 2:
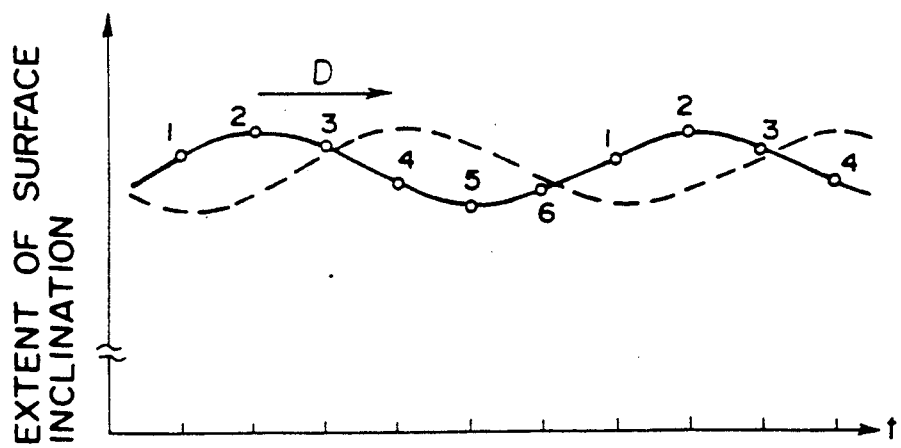
FIG. 2 is a graph showing examples of the extents of surface inclination found by detecting a light beam, which is reflected and deflected by respective reflecting surfaces of a rotating polygon mirror, with a position sensitive device.

FIG. 2 is a graph showing the extends of surface inclination, which have been found in the manner described above.

In FIG. 2, small circles represent the extents of surface inclination, which have been found in the manner described above and the information about which has been stored in the clock signal generating circuit 46. The numerals indicated at the small circles represent the numbers of the reflecting surfaces of the rotting polygon mirror 36. However, information about the reflecting surface of the rotating polygon mirror 36 which corresponds to the reflecting surface assigned with the number of, for example, 1, in FIG. 2 is not necessary. It is only necessary that the laser beam 34 is reflected and deflected by the reflecting surfaces assigned with the numbers 1, 2, ... in this order.

As described above, the surface inclination is caused to occur by, primarily, the inclination of the rotation axis. Therefore, as shown in FIG. 2, the extent of surface inclination changes in an approximately sinusoidal pattern with a period corresponding to one turn of the rotating polygon mirror 36.

After the aforesaid preparation has been made, the stimulable phosphor sheet 31 is scanned with the laser beam 34 and the analog image signal SA is obtained in the same manner as that described above. The analog image signal SA thus obtained is fed into the amplifier 42 and then into the analog operation circuit 43. The analog image signal SA is then sampled by the A/D converter 44.

At this time, before the stimulable phosphor sheet 31 is conveyed to the position corresponding to the main scanning line, the signal representing the fluctuation of the position of the laser beam 34 in the sub-scanning direction (i.e. the extent of surface inclination) is fed from the PSD 45 into the clock signal generating circuit 46 in the same manner as that described above. From this signal and the information about the extents of surface inclination of the respective reflecting surfaces, information which is stored in the clock signal generating circuit 46, a clock signal representing reflecting surface which is reflecting and deflecting the laser beam 34 at any given instant is generated.

An example of how the clock signal is generated will be described hereinbelow with reference to FIG. 2.

In FIG. 2, the broken line represents the pattern of the extents of surface inclination with respect to the laser beam 34, which is being currently reflected and deflected by the reflecting surfaces. (This pattern will hereinbelow be referred to as the second pattern.) The second pattern is compared with the pattern of the extents of surface inclination, the information about which is stored in the clock signal generating circuit 46. (This pattern is indicated by the solid line in FIG. 2 and will hereinbelow be referred to as the first pattern.) Thereafter, the first pattern is shifted by a length of distance corresponding to a single graduation (corresponding to a single reflecting surface) in the direction indicated by the arrow D in FIG. 2. The first pattern thus shifted is then compared with the second pattern. Thereafter, the first pattern is shifted even further by a length of distance corresponding to a single graduation and compared with the second pattern. In this manner, the amount of shifting is found, which yields the highest correlation between the first pattern and the second pattern. In the example of FIG. 2, when the first pattern is shifted by a length of distance corresponding to two graduations (corresponding to two reflecting surfaces) in the direction indicated by the arrow D, the first pattern and the second pattern approximately coincide with each other. Therefore, the amount of shifting corresponding to two graduations is found as the amount, which yields the highest correlation between the first pattern and the second pattern. From the amount of shifting, which yields the highest correlation between the first pattern and the second pattern and which has been found in this manner, the numbers, 1, 2, ..., 6, of the reflecting surfaces, which are reflecting and deflecting the laser beam 34 at any given instant, can be found. The clock signal can be generated in this manner. The clock signal is fed into a table storing circuit 47.

The manner in which the characteristics of shading of the photoelectric conversion means along the main scanning direction indicated by the arrow X, or the like, are found will be described hereinbelow. The photoelectric conversion means is constituted of the light guide member 40 and the photomultiplier 41.

In an X-ray image recording apparatus (not shown), a stimulable phosphor sheet is uniformly exposed to X-rays. In this manner, energy from the X-rays is uniformly stored on the stimulable phosphor sheet. The stimulable phosphor sheet is placed at the predetermined position in the image read-out apparatus 30, and an image signal SD0 representing the uniform image is detected from the stimulable phosphor sheet. From the image signal SD0, the characteristics of shading are found, which are unrelated to the reflecting surfaces of the rotating polygon mirror 36. In this embodiment, first correction values, each of which is used to correct the characteristics of the shading with respect to each of the reflecting surfaces of the rotating polygon mirror 36, are also found from the image signal SD0. The information about the characteristics of shading and the information about the first correction values are stored in a correction table in the table storing circuit 47. When an image stored on a stimulable phosphor sheet is read out in the same manner as that described above, the information about the characteristics of shading and the information about the first correction values are converted into analog signals by a D/A converter 48. The analog signals are fed into the analog operation circuit 43. In the analog operation circuit 43, the analog image signal generated by the amplifier 42 is corrected such that the adverse effects from the nonuniformity in the sensitivity due to the characteristics of shading, surface inclination of the rotating polygon mirror 36, or the like, may be eliminated from the analog image signal.

The image signal, which has been compensated for the nonuniformity in the sensitivity in the manner described above, is converted into a digital image signal by the A/D converter 44. The digital image signal is then fed into the image processing unit (not shown) and a correction value altering circuit 49. The correction value altering circuit 49 calculates the mean value of the values of the image signal components of the image signal SD, which correspond to each of the reflecting surfaces of the rotating polygon mirror 36. In cases where the mean values thus calculated for the respective reflecting surfaces do not coincide with the mean values, which were calculated previously for the corresponding reflecting surfaces, second correction values for correcting the first correction values, the information about which is stored in the correction table in the table storing circuit 47, are calculated from the mean values calculated currently. The information about the second correction values is fed into the table storing circuit 47, and the first correction values are corrected in accordance with the second correction values. In this embodiment, when the mean values calculated for the respective reflecting surfaces by the correction value altering circuit 49 change markedly, the first correction values are not markedly changed in accordance with the second correction values, but are changed only slightly each time an image is read out. Therefore, the problem can be prevented from occurring in that the first correction values are disturbed markedly by an image signal detected from a special image.

In the embodiment described above, the characteristics of shading are found, which are unrelated to the reflecting surfaces of the rotating polygon mirror 36. Also, the first correction values are found, each of which is used to correct the characteristics of the shading with respect to each of the reflecting surfaces of the rotating polygon mirror 36. The information about the characteristics of shading and the information about the first correction values are stored in the correction table in the table storing circuit 47. Alternatively, as an embodiment of the first method for eliminating nonuniformity in sensitivity in an image read-out apparatus in accordance with the present invention, in cases where, for example, no special image is read out and there is no risk that the correction values are disturbed markedly, only the information about the characteristics of shading may be stored in the table storing circuit 47. In the analog operation circuit 43, the analog image signal may be corrected with respect to only the characteristics of shading. After the digital image signal SD is obtained, a calculation may be made to find the mean value of the values of the image signal components of the image signal SD, which correspond to each of the reflecting surfaces of the rotating polygon mirror 36. From the mean values thus calculated for the respective reflecting surfaces, correction values may be found, each of which is used to correct the characteristics of the shading with respect to each of the reflecting surfaces of the rotating polygon mirror 36. The image signal SD may then be corrected in accordance with the correction values, which have thus been found.

In the aforesaid embodiments of the first and second methods for eliminating nonuniformity in sensitivity in an image read-out apparatus in accordance with the present invention, instead of the analog operation circuit 43 being provided, the nonuniformity in the sensitivity may be eliminated by carrying out digital operation processing.

In the embodiment of the second method for eliminating nonuniformity in sensitivity in an image read-out apparatus in accordance with the present invention, the second correction values may be found from the image signal, which has been detected from the whole X-ray image stored on the stimulable phosphor sheet. Alternatively, in cases where the X-ray image includes a background region, upon which the X-rays impinged directly without passing through the object, the second correction values may be found from the image signal components of the image signal, which correspond to the background region. As another alternative, in cases where the X-ray image was recorded with an irradiation field stop, the second correction values may be found from the image signal components of the image signal, which correspond to the region inside of the irradiation field.

Also, in the embodiment of the first method for eliminating nonuniformity in sensitivity in an image read-out apparatus in accordance with the present invention, the correction values may be found from the image signal, which has been detected from the whole X-ray image stored on the stimulable phosphor sheet. Alternatively, in cases where the X-ray image includes a background region, upon which the X-rays impinged directly without passing through the object, the correction values may be found from the image signal components of the image signal, which correspond to the background region. As another alternative, in cases where the X-ray image was recorded with an irradiation field stop, the correction values may be found from the image signal components of the image signal, which correspond to the region inside of the irradiation field.

An embodiment of the third method for eliminating nonuniformity in sensitivity in an image read-out apparatus in accordance with the present invention will be described hereinbelow.

FIG. 3 is a schematic view showing an image read-out apparatus wherein an embodiment of the third method for eliminating nonuniformity in sensitivity in accordance with the present invention is employed. The image read-out apparatus is constituted as an X-ray image read-out apparatus wherein an X-ray image is read out from a stimulable phosphor sheet, on which the X-ray image has been stored, and an image signal is thereby generated. In FIG. 3, similar elements are numbered with the same reference numerals with respect to Figure 1.

Nonuniformity in the sensitivity due to differences in surface inclination, reflectivity and curvature among the reflecting surfaces of the rotating polygon mirror 36 occurs along the sub-scanning direction. Also, in a single reflecting surface, the position, from which the laser beam 34 is reflected, changes as the rotating polygon mirror 36 rotates. Therefore, the nonuniformity in the sensitivity due to the rotating polygon mirror 36 is also caused to occur in the main scanning direction by differences in reflectivity and curvature for various parts of each reflecting surface.

Figure 4A:
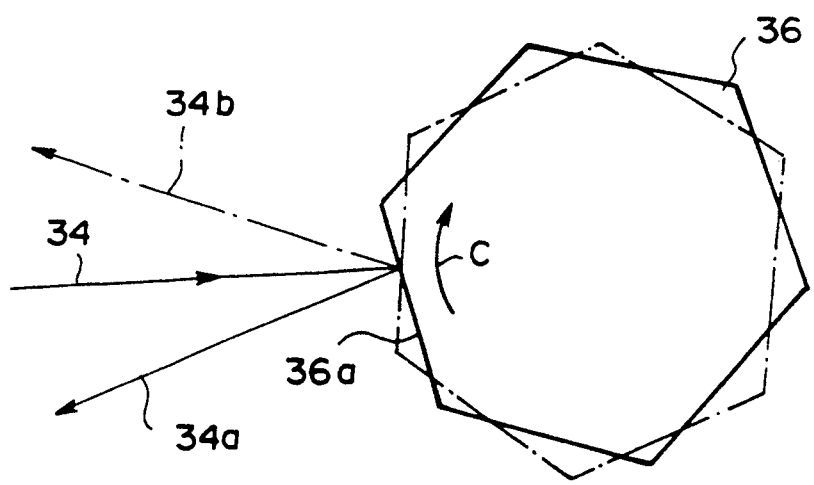
FIGS. 4A and 4B are explanatory views showing how the position, from which a light beam is reflected, changes in a single reflecting surface of the rotating polygon mirror.
Figure 4B:
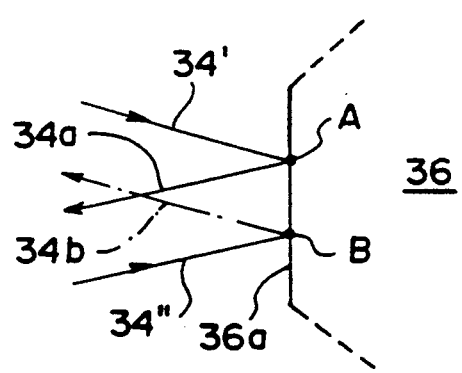

FIGS. 4A and 4B are explanatory views showing how the position, from which the laser beam 34 is reflected, changes in a single reflecting surface of the rotating polygon mirror 36.

In FIG. 4A, the rotating polygon mirror 36 rotates in the direction indicated by the arrow C. The instant, at which the laser beam 34 is reflected by a reflecting surface 36a in the direction indicated by the arrow 34a, and the instant, at which the laser beam 34 is reflected by the reflecting surface 36a in the direction indicated by the arrow 34b, are compared with each other.

In FIG. 4B, as an aid in facilitating the explanation, it is assumed that the rotating polygon mirror 36 is stationary. In such cases, at the instant at which the rotating polygon mirror 36 takes the 20 orientation indicated by the solid line in FIG. 4A, the laser beam 34 (34') impinges upon the point A on the reflecting surface 36a. At the instant at which the rotating polygon mirror 36 takes the orientation indicated by the chained line in FIG. 4A, the laser beam 34 (34") impinges upon the point B on the reflecting surface 36a. Specifically, the laser beam 34 sequentially impinges upon different positions on the single reflecting surface 36a, which correspond to different positions located along the main scanning direction. Therefore, when the main scanning is effected by the single reflecting surface 36a, the nonuniformity in the sensitivity among the positions located along the main scanning direction is caused to occur by local fluctuations in reflectivity, curvature, surface inclination, or the like, in the single reflecting surface 36a.

The clock signal used to specify the reflecting surface, which is reflecting and deflecting the laser beam 34 at any given instant, is generated in the same manner as that described above. In the course of generating the clock signal, fluctuations in each reflecting surface are not found, but only the fluctuations among the reflecting surfaces (the extents of surface inclination) are found. The clock signal generated by the clock signal generating circuit 46 is fed into a shading correction table storing circuit 147 and a fluctuation correction table storing circuit 148.

The manner in which characteristics of shading of the photoelectric conversion means along the main scanning direction indicated by the arrow X and first correcting functions are found will be described hereinbelow. The first correcting functions are used to eliminate the nonuniformity in the sensitivity due to various fluctuations among the reflecting surfaces of the rotating polygon mirror 36 and various fluctuations in each reflecting surface.

In an X-ray image recording apparatus (not shown), a stimulable phosphor sheet is uniformly exposed to X-rays. In this manner, energy from the X-rays is uniformly stored on the stimulable phosphor sheet. The stimulable phosphor sheet is placed at the predetermined position in the image read-out apparatus 30, and an image signal SD0 representing the uniform image is detected from the stimulable phosphor sheet. From the image signal SD0, the characteristics of shading are found, which are unrelated to the reflecting surfaces of the rotating polygon mirror 36. Also, the first correcting functions, each of which is used to correct the characteristics of the shading with respect to each reflecting surface of the rotating polygon mirror and with respect to each of positions on each reflecting surface, are found from the image signal SD0.

Figure 5:
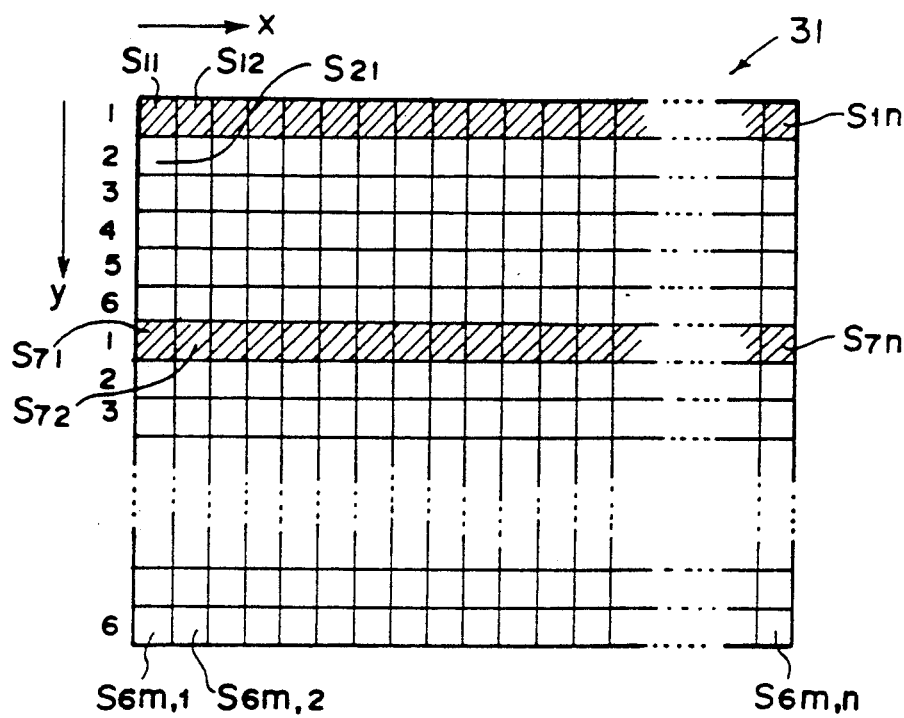
FIG. 5 is an explanatory view showing picture elements located on a stimulable phosphor sheet, which has been uniformly exposed to radiation, as an aid in explaining how the characteristics of shading and first correcting functions are found.

FIG. 5 is an explanatory view showing picture elements located on a stimulable phosphor sheet 31, which has been uniformly exposed to radiation, as an aid in explaining how the characteristics of shading and the first correcting functions are found (in case that the polygon mirror has 6 reflecting surfaces). In FIG. 5, small square regions correspond to sampled image signal components of the image signal SD0 representing the uniform image. Also, the directions indicated by the arrows x and y correspond to the main scanning direction indicated by the arrow X and the sub-scanning direction indicated by the arrow Y in FIG. 3. The image signal components of the image signal SD0 representing the picture elements arrayed along the directions indicated by the arrows x and y are represented by Si], where i is a variable along the direction indicated by the arrow y, and j is a variable along the direction indicated by the arrow x.

Regardless of which reflecting surface of the rotating polygon mirror 36 reflects and deflects the laser beam, the functions Q(x) representing the characteristics of shading are obtained by averaging the values of the image signal components Si]representing the picture elements arrayed along the sub-scanning direction. The calculation is carried out with the formula $$Qj = (S1,j + S2,j + \ldots + S6m,j)/6m \quad (1)$$

Figure 6:
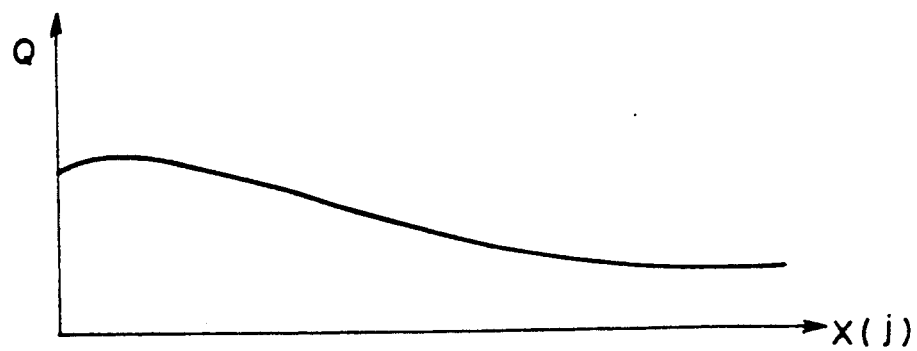
FIG. 6 is a graph showing an example of the characteristics of shading, Q(x)

FIG. 6 is a graph showing an example of the characteristics of shading, Q(x).

Regardless of which reflecting surface of the rotating polygon mirror 36 reflects the laser beam and causes it to scan along the main scanning direction, the characteristics of shading, Q(x), are found by averaging the values of the image signal components along the sub-scanning direction with Formula (1). Therefore, the characteristics of shading, Q(x), are free of the nonuniformity in the sensitivity due to the rotating polygon mirror 36 and reflect only the nonuniformity in the sensitivity due to the photoelectric conversion means constituted of the light guide member, the photomultiplier, or the like.

Reverting to FIG. 5, the manner in which the first correcting functions are found for the respective reflecting surfaces of the rotating polygon mirror 36 will be described hereinbelow.

Numerals 1, 2, ..., 6, 1, ... arrayed along the direction indicated by the arrow y in FIG. 5 represent the numbers assigned to the reflecting surfaces of the rotating polygon mirror 36, which have been found in the manner described above. The first correcting function, $\Delta Q1$, for the first reflecting surface (i.e. the reflecting surface assigned with the number of 1) is found in the manner described below. Specifically, the values of the image signal components, $S1+6k,j$, where $k=0, 1, 2, \ldots$, which are obtained by the main scanning with the laser beam 34 reflected by the first reflecting surface, are averaged along the sub-scanning direction. The calculation is carried out with the formula $$S1 = (S1,j + S7,j + \ldots) \cdot 6/m \quad (2)$$

In this manner, the fluctuation function, Sl(x), for the first reflecting surface is obtained. Thereafter, the first correcting function $\Delta Q(x)$ for the first reflecting surface is obtained with the formula $$\Delta Q1(x) = Q(x) - S1(x) \quad (3)$$

Figure 7:
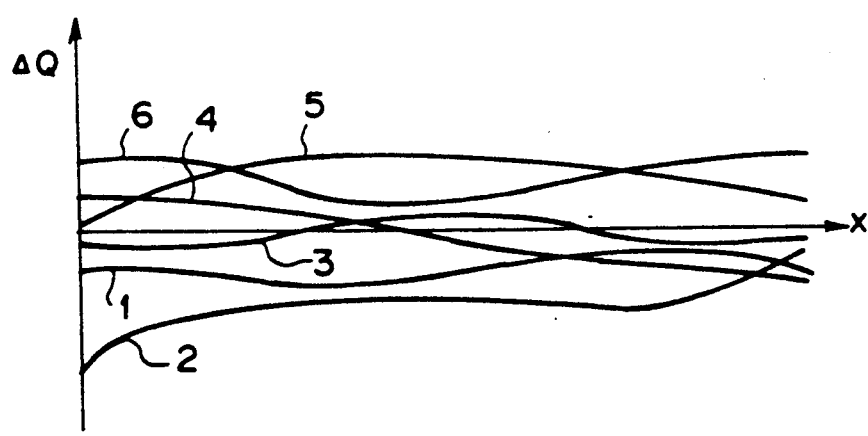
FIG. 7 is a graph showing examples of the first correcting functions, $\Delta Q1(x)$, $\Delta Q2(x)$, ..., $\Delta Q6(x)$, which have been obtained for the respective reflecting surfaces of the rotating polygon mirror.

FIG. 7 is a graph showing the first correcting functions, $\Delta Q1(x), \Delta Q2(x), \ldots, \Delta Q6(x)$, which have been obtained for the respective reflecting surfaces of the rotating polygon mirror 36 in the manner described above. In FIG. 7, the numerals represent the numbers assigned to the respective reflecting surfaces of the rotating polygon mirror 36.

The information about the characteristics of shading, Q(x), found in the manner described above is stored in the shading correction table storing circuit 147 shown in FIG. 3. The information about the first correcting functions $\Delta Q1(x), \Delta Q2(x), \ldots, \Delta Q6(x)$, is stored in the fluctuation correction table storing circuit 148. When an image stored on a stimulable phosphor sheet is read out in the manner described above, the characteristics of shading, Q(x), and the first correcting functions, $\Delta Q1(x), \Delta Q2(x), \ldots, \Delta Q6(x)$, are added together. The resulting signal is then converted by a D/A converter 149 into an analog signal and fed into the analog operation circuit 43. The analog operation circuit 43 corrects the analog image signal, which is received from the amplifier 42, such that the adverse effects from the nonuniformity in the sensitivity due to the characteristics of shading, fluctuations among the reflecting surfaces of the rotating polygon mirror 36, and fluctuations in each reflecting surface, may be eliminated from the analog image signal.

The image signal, which has been compensated for the nonuniformity in the sensitivity in the manner described above, is converted into a digital image signal by the A/D converter 44. The Digital image signal is then fed into the image processing unit (not shown) and a correction table altering circuit 150. The correction table altering circuit 150 in second correcting functions, ΔQ1(x)', ΔQ2(x)', . . ., ΔQ6(x)', for the respective reflecting surfaces from the image signal SD. Formula (2) is used for this purpose, the information about the second correcting functions, ΔQ1(x)', ΔQ2(x)', . . ., ΔQ6(x)', is fed into the fluctuation correction table storing circuit 148. In the fluctuation correction table storing circuit 148, the information about the first correcting functions, ΔQ1(x), ΔQ2(x), . . ., ΔQ6(x), is corrected in accordance with the information about the second correcting functions, ΔQ1(x)', ΔQ2(x)', . . ., ΔQ6(x)'.

In this embodiment, when the second correcting functions, ΔQ1(x)', ΔQ2(x)', . . ., ΔQ6(x)' found by the correction table altering circuit 150 have markedly large values, the original correcting functions are altered only slightly to new ones each time an image is read out. The alteration is carried out with the formula $$\Delta Q1(\text{new}) = (1 - \alpha) \cdot \Delta Q1 + \alpha \cdot \Delta Q1'$$
$$\Delta Q2(\text{new}) = (1 - \alpha) \cdot \Delta Q2 + \alpha \cdot \Delta Q2'$$
$$\ldots \quad \ldots \quad \ldots$$
$$\Delta Q6(\text{new}) = (1 - \alpha) \cdot \Delta Q6 + \alpha \cdot \Delta Q6'$$

where $\alpha$ denotes a positive value markedly smaller than 1. The new correcting functions are stored in the fluctuation correction table storing circuit 148 in lieu of the original correcting functions. Therefore, the problem can be prevented from occurring in that the first correcting functions, ΔQ1(x), ΔQ2(x), . . ., ΔQ6(x), are disturbed markedly by an image signal detected from a special image.

In the aforesaid embodiment of the third method for eliminating nonuniformity in sensitivity in an image read-out apparatus in accordance with the present invention, instead of the analog operation circuit 43 being provided, the nonuniformity in the sensitivity may be eliminated by carrying out digital operation processing.

The aforesaid embodiments of the first, second, and third methods for eliminating nonuniformity in sensitivity in accordance with the present invention are employed in the X-ray image read-out apparatus wherein an X-ray image stored on a stimulable phosphor sheet is read out. The first, second, and third methods for eliminating nonuniformity in sensitivity in accordance with the present invention are also applicable when images recorded on recording media other than stimulable phosphor sheets are photoelectrically detected and converted into image signals.

I claim:

1. A method for eliminating nonuniformity in sensitivity in an image read-out apparatus which is provided with:
   i) a light beam producing means which produces a light beam,
   ii) a main scanning means provided with a rotating polygon mirror, which has a plurality of reflecting surfaces and which reflects and deflects the light beam such that it scans a recording medium, on which an image has been recorded, in a main scanning direction,
   iii) a sub-scanning means, which moves the recording medium with respect to the light beam in a sub-scanning direction approximately normal to the main scanning direction, and
   iv) a photoelectric conversation means for detecting light, which is radiated out of the recording medium during the scanning with the light beam and which represents the image, and generating an image signal representing the image,
   the method for automatically compensating for any change in nonuniformity in sensitivity in an image read-out apparatus comprising the steps of:
   a) storing the information about the characteristics of the shading based upon the surface inclination of said rotating polygon mirror and differences in reflectivity among reflecting surfaces of said polygonal mirror along the main scanning direction in a storage means,
   b) in the course of obtaining said image signal, finding correction values, each of which is used to correct said characteristics of the shading with respect to each of said reflecting surfaces of said rotating polygon mirror, from said image signal, and
   c) correcting said image signal in accordance with said characteristics of the shading and said correction values.

2. A method as defined in claim 1 wherein said recording medium is a stimuable phosphor sheet on which said image has been stored in the form of a radiation image, and said light, which is radiated out of said recording medium during the scanning with said light beam and which represents the image, is light emitted by said stimulable phosphor sheet when said stimulable phosphor sheet is scanned with stimulating rays which serve as said light beam, the amount of which light is proportional to the amount of energy stored on said stimulable phosphor sheet during its exposure to radiation.

3. A method as defined in claim 1 wherein said light beam is a laser beam.

4. A method for eliminating nonuniformity in sensitivity in an image read-out apparatus which is provided with:
   i) a light beam producing means which produces a light beam,
   ii) a main scanning means provided with a rotating polygon mirror, which has a plurality of reflecting surfaces and which reflects and deflects the light beam such that it scans a recording medium, on which an image has been recorded, in a main scanning direction,
   iii) a sub-scanning means, which moves the recording medium with respect to the light beam in a sub-scanning direction approximately normal to the main scanning direction, and
   iv) a photoelectric conversation mean for detecting light, which is radiated out of the recording medium during the scanning with the light beam and which represents the image, and generating an image signal representing the image,
   the method for automatically compensating for any change in nonuniformity in sensitivity in an image read-out apparatus comprising the steps of:
   a) storing the information about the characteristics of the shading based upon the surface inclination of said polygon mirror and differences in reflectivity among reflecting surfaces of said polygonal mirror along the main scanning direction and the information about first correction values, each of which is used to correct said characteristics of the shading with respect to each of said reflecting surfaces of said rotating polygon mirror, in a storage means, b) in the course of obtaining said image signal, correcting said image signal in accordance with said characteristics of the shading and said fist correction values, c) finding second correction values, which are used to correct said first correction values, from said image signal, and d) correcting the information about said first correction values, which is stored in said storage means, in accordance with said second correction values.

5. A method as defined in claim 4 wherein said first correction values are changed only slightly in accordance with said second correction values each time an image is read out.

6. A method as defined in claim 4 wherein said recording medium is a stimulable phosphor sheet on which said image has been stored in the form of a radiation image, and said light, which is radiated out of said recording medium during the scanning with said light beam and which represents the image, is light emitted by said stimulable phosphor sheet when said stimulable phosphor sheet is scanned with stimulating rays which serve as said light beam, the amount of which light is proportional to the amount of energy stored on said stimulable phosphor sheet during its exposure to radiation.

7. A method as defined in claim 4 wherein said light beam is a laser beam.

8. A method for eliminating nonuniformity in sensitivity in an image read-out apparatus which is provided with:

i) a light beam producing mean which produces a light beam, ii) a main scanning means provided with a rotating polygon mirror, which has a plurality of reflecting surfaces and which reflects and deflects the light beam such that it scans a recording medium, on which an image has been recorded, in a main scanning direction, iii) a sub-scanning means, which moves the recording medium with respect to the light beam in a sub-scanning direction approximately normal to the main scanning direction, and iv) a photoelectrical conversion means for detecting light, which is radiated out of the recording medium during the scanning with the light beam and which represents the image, and generating in image signal representing the image, the method for automatically compensating for any change in nonuniformity in sensitivity in an image read-out apparatus comprising the steps of:

a) storing the information about the characteristics of the shading based upon the surface inclination of said rotating polygon mirror and differences in reflectivity among reflecting surfaces of said polygonal mirror along the main scanning direction and the information about first correcting functions, each of which has been found for each of said reflecting surfaces of said rotating polygon mirror and is used to correct said characteristics of the shading with respect to the respective positions located along the main scanning direction, in a storage means, b) in the course of obtaining said image signal, correcting said image signal in accordance with said characteristics of the shading and said first correcting functions, c) finding second correcting functions, which are used to correct said first correcting functions, from said image signal, and d) correcting the information about said first correcting functions, which is stored in said storage means, in accordance with said second correcting functions.

9. A method as defined in claim 8 wherein said first correcting functions are changed only slightly in accordance with said second correcting functions each time an image is read out.

10. A method as defined in claim 8 wherein said recording medium is a stimulable phosphor sheet on which said image has been stored in the form of a radiation image, and said light, which is radiated out of said recording medium during the scanning with said light beam and which represents the image, is light emitted by said stimulable phosphor sheet when said stimulable phosphor sheet is scanned with stimulating rays which serve as said light beam, the amount of which light is proportional to the amount of energy stored on said stimulable phosphor sheet during its exposure to radiation.

11. A method as defined in claim 8 wherein said light beam is a laser beam.

* * * * *